UNITED STATES PATENT OFFICE.

LEON LILIENFELD, OF VIENNA, AUSTRIA-HUNGARY.

PROCESS OF MANUFACTURING COMPOSITIONS OF MATTER.

1,090,730. Specification of Letters Patent. Patented Mar. 17, 1914.

No Drawing. Application filed July 10, 1912. Serial No. 708,636.

*To all whom it may concern:*

Be it known that I, LEON LILIENFELD, chemist, of Zeltgasse 1, Vienna, VIII, in the Empire of Austria-Hungary, have invented new and useful Improvements in Processes of Manufacturing Compositions of Matter, of which the following is a specification.

This invention relates to improvements in the process of manufacturing compositions of matter by means of heating a drying oleaginous substance with an aromatic substance in the presence of a condensing agent, as described in the applicant's prior Patent Number 1,037,158.

I have found that the resinlike or rubberlike bodies, which are obtained in accordance to the aforementioned process, will reach a higher melting point and a higher degree of hardness as well as a greater elasticity if those bodies either in neutral or alkaline or acid reaction, are treated with formaldehyde either in solution or in gaseous form, or if the reaction itself by which the resinlike or rubberlike bodies are formed, takes place in the presence of formaldehyde.

In practising this improved process I treat the resinlike or rubberlike bodies, preferably under application of heat viz. in molten state, with formaldehyde either in gaseous form or in any of its solutions, *e. g.* in water or in methyl or ethyl alcohol or the like, and preferably under kneading. Though obvious it may be remarked that the same result will be obtained if the said resinlike or rubberlike bodies are dissolved in a suitable dissolving agent as for instance benzol, turpentine, tetrachlormethan, acetone, or the like and if these solutions are subjected, preferably under application of heat, to the action of formaldehyde either in solution or in gaseous form.

In order to give a clear understanding of the novel features of the process I illustrate the same by two examples.

Example 1: 100 parts by weight of Chinese wood oil are mixed with 100 to 200 parts by weight of orthotoluidin and heated to a temperature of about 80° C. whereafter a solution of 11 parts by weight of zinc chlorid in 11 parts by weight of water is added to the mixture. The temperature is gradually raised while agitating and the excess of toluidin is recollected in a distilling vessel connected with the apparatus. When the heating bath (for example an oil bath or a bath of molten metal) has reached a temperature of 260 to 290° C., the heating is continued until a specimen of the mass becomes hard and resinlike after cooling. Then the apparatus is emptied, the mass is left to get cold and is washed in a suitable device (for example in a kneading machine or in a rubber washing machine or the like) with water until the water contains no more chlorid of zinc. Then the mass is dried and treated in a kneading machine, whereafter 2 to 20 parts by weight of a 40 per cent. solution of formaldehyde or the equivalent quantity of trioxymethylene is kneaded in slowly and heated for some time. The process according to this example may also be carried out in such a manner that the aqueous solution of formaldehyde or the equivalent quantity of trioxymethylene is added from the beginning to the mixture of Chinese wood oil and orthotoluidin.

Example 2: 150 parts by weight of Chinese wood oil and 45 parts by weight of orthotoluidin are heated to a temperature of 80° C. whereafter 17 parts by weight of a 50% solution of zinc chlorid in water are added. The temperature is raised slowly and the mixture is thoroughly stirred during that time. At a temperature of about 200° C. the excess of toluidin becomes volatile and escapes and at a temperature of about 230° C. the mixture begins to thicken. Now it is heated until the mass becomes rubber-like, whereafter it is taken out and cooled rapidly. After cooling the mass is kneaded thoroughly in a kneading machine at a temperature of about 80 to 100° C. and then 0.5 to 10 parts by weight of a 40% solution of formaldehyde or the equivalent quantity of trioxymethylene are kneaded in. The material becomes pulverulent at this operation, but if worked between the steel rollers of a kneading roller, it forms caoutchouc-like foils. In order to free the material from chlorid of zinc, it is washed thoroughly in a kneading machine with water and then it is dried.

I claim:

1. A process for manufacturing compositions of matter, which consists in heating a drying oleaginous substance with an aromatic substance in the presence of a condensing agent and treating the product of reaction with formaldehyde.

2. A process for manufacturing compositions of matter, which consists in treating a drying oleaginous substance with an aromatic substance in the presence of a condensing agent and carrying out the reaction in the presence of formaldehyde.

3. A process for manufacturing compositions of matter, which consists in heating wood oil with amidoderivatives of aromatic hydrocarbons together with a suitable condensing agent and treating the product of reaction in liquid state with formaldehyde.

In testimony whereof I have signed my name to this specification in the presence of two subscribing witnesses.

DR. LEON LILIENFELD.

Witnesses:
FRED P. SCHUMANN,
AUGUST FUGGER.